United States Patent Office 3,158,438
Patented Nov. 24, 1964

3,158,438
SOLVENT EXTRACTION PROCESS FOR RECOVERING TUNGSTEN VALUES FROM CONTAMINATED AQUEOUS SOLUTIONS
Charles R. Kurtak, Bishop, Calif., assignor to Union Carbide Corporation, a corporation of New York
No Drawing. Filed Sept. 19, 1962, Ser. No. 224,828
4 Claims. (Cl. 23—22)

The present invention relates to an improved amine solvent extraction process for recovery of tungsten from aqueous molybdenum and silica contaminated tungsten bearing solutions. More particularly the present invention relates to an amine solvent extraction process for the recovery of tungsten wherein molybdenum and silicon contaminants are selectively removed from tungsten bearing solution by separate steps in an integrated amine solvent extraction process.

The use of amines to extract tungsten and molybdenum has been known for some time. Molybdenum must be removed from the tungsten bearing solution prior to the organic solvent extraction step if a molybdenum-free product is desired since amine containing organic solvent extractant formulations are not capable of sharply and selectively removing tungsten from molybdenum although the amines will separate the tungsten from contaminants such as sodium, aluminum and phosphorous. The reason why amines will not selectively extract tungsten from molybdenum contaminated solutions is two fold. Amines will form extractable complexes with tungsten or molybdenum only when these amines are contacted with an aqueous acidic solution of tungsten and molybdenum. But when tungsten and molybdenum are both present in an acidic solution they exist as heteropoly ions, i.e., they are associated as a complex ion, and therefore the tungsten and molybdenum are not free to form separate extractable complexes.

The tungsten loaded organic phase resulting from the organic solvent extraction step contains some amount of silicon in the form of a silico-tungsten complex. This silicon complex follows the tungsten values into the stripping solution and there is no complete and selective removal of tungsten from silicon contaminants during the organic solvent extraction step.

Accordingly it is an object of the present invention to provide an integrated solvent extraction process wherein an amine is employed but wherein tungsten is selectively separated from molybdenum prior to amine solvent extraction of tungsten and silica is selectively removed from the tungsten after the amine solvent extraction step. Amine solvent extraction is not used primarily to separate the tungsten from the molybdenum and silica contaminants. Other objects include preparation of extremely high purity ammonium paratungstate from molybdenum and silica contaminated aqueous tungsten-bearing solutions.

The invention achieving the aforementioned objects comprises an improvement in process wherein amine solvent extraction is employed for recovering tungsten values consisting of preceding the amine solvent extraction step by a specific molybdenum removal step and following the amine solvent extraction step by a specific silica removal step.

The molybdenum removal step comprises adjusting the pH of an alkaline molybdenum-contaminated aqueous solution of tungsten values to a pH of at least 8 or higher and adding thereto at least 170 percent of the amount of alkali sulfide stoichiometrically required to convert the molybdenum contaminant in the solution to a thio-molybdate complex ion. The alkaline solution is so treated at an elevated temperature until the molybdenum contaminants are converted to the thiomolybdate complex ion and then is acidified, with mineral acid for example, until the pH of the solution is below about 3.0 whereby the thiomolybdate complex ion is converted to insoluble molybdenum trisulfide which precipitates from solution. The molybdenum is then separated as insoluble molybdenum trisulfide from the acidified solution of tungsten values.

The silica removal step comprises adjusting the silica contaminated, but molybdenum-free, tungsten containing stripping solution, resulting from an amine solvent extraction step, to at least two molar in ammonium hydroxide and digesting the solution at a temperature of at least 50° C. for a period of at least one hour to cause precipitation of silica as an amorphous silicon dioxide.

The organic phases which may be employed in the solvent extraction step comprise an amine dissolved in a suitable organic solvent, both of which are sparingly soluble in water. The amine must be capable of forming tungstate-amine complexes which are in turn soluble in the organic phase.

Suitable amines include such primary amines as:

Aniline
Acetyl amine

An amine having the structure:

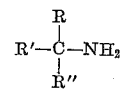

where R+R'+R" contain 15 to 21 carbon atoms, also known commercially as Primene JM–T.

Secondary amines such as:

Bis(methyl benzyl) amine
Bis(decyl) amine
Bis(tridecyl) amine
Bis(1-isobutyl-3,5-dimethylhexyl) amine An amine having the structure:

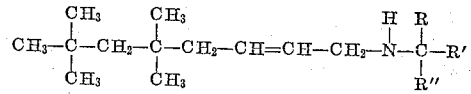

where R+R'+R" contain 11 to 14 carbon atoms, also known commercially as Primeme 81 n-benzyl 1(3-ethyl pentyl)-4-ethyl-octylamine.

Tertiary amines such as:

Tris(tridecyl) amine
Tris(amyl) amine
Tris(isooctyl) amine

Extraction is best accomplished by contact of the two phases in one or more mixer-settler combinations although other suitable procedures may be employed.

Bistridecylamine in kerosene containing 10 percent undecanol is an excellent extractant although many other extractant-diluent combinations are suitable. For example, many primary, secondary, and tertiary amines may be used which have the following general characteristics:

(1) For primary amines, the radical should preferably be an aryl, alkyl, or alkenyl group containing at least six carbon atoms or a sufficient number of carbon atoms to impart low water solubility and high organic solubility so as to give a high distribution coefficient in the two-phase organic solvent and water system employed and leave less than about 0.5 gram of amine dissolved in each liter of the aqueous phase;

(2) For secondary amines, the two radicals should preferably be two of the following in any combination: aryl, alkyl, or alkenyl. In addition, the total number of carbon atoms should be at least six or a sufficient number to impart low water solubility and high organic solubility so as to give a high distribution coefficient in the two phase organic solvent and water system employed and leave less than about 0.5 gram of amine dissolved in each liter of aqueous phase;

(3) For tertiary amines, the three radicals should preferably be three of the following in any combination: aryl, alkyl, or alkenyl. In addition the total number of carbon atoms should be at least six or a sufficient number to impart low water solubility and higher organic solubility so as to give a high distribution coefficient in the two phase organic solvent and water system employed and leave less than about 0.5 gram of amine dissolved in each liter of aqueous phase.

A number of solvents are amenable for use in the organic phase of the invention. Kerosenes in general, both aliphatic and aromatic containing kerosenes may be used. High flash point kerosenes preferably those high in aromatic content are most desirable. A phase conditioner is helpful although not always necessary. The phase conditioner may be any long-chain aliphatic alcohol having 10 to 15 carbon atoms in the molecule, although long-chain aliphatic alcohols in general may be used.

It has further been found that little or no phase conditioner may be necessary when relatively pure aromatic kerosenes are utilized while relatively pure aliphatic kerosenes may require considerable amounts of phase conditioner depending on the amount of aliphatics present. Other suitable solvents include diisobutyl ketone, diethyl ketone, and toluene.

Table I gives actual examples of various amine-diluent combinations and the percent $WO_3$ extracted from the aqueous phase by the use of each:

entrained droplets of aqueous sodium-contaminated solution. In order to remove as much sodium as possible, the organic phase may be washed with water, for example, in a mixer-settler combination. This washing serves to decrease the sodium concentrations of the entrained droplets and the wash water is discarded.

The next step is to strip the tungsten from the organic phase. This is accomplished by contacting the organic solution with an aqueous solution of ammonia or ammonium hydroxide. This is readily accomplished by the use of counter-current mixer-settler stages and 1 molar $NH_4OH$ at a 1:1 ratio with the organic phase. Although one molar ammonium hydroxide solution has been found to be satisfactory, higher and lower concentrations may be used. Lower concentrations of ammonium hydroxide eventually approach solutions which have insufficient tungsten capacity.

The molybdenum removal step per se is disclosed and claimed as a separate invention in U.S. patent application Serial No. 831,715, filed August 5, 1959, by C. R. Kurtak, now abandoned, and the continuation-in-part Serial No. 224,827 filed September 19, 1962. The silicon removal step per se is disclosed in U.S. patent application Serial No. 33,886, filed June 6, 1960, by C. R. Kurtak. The present application is a continuation-in-part of all of the aforementioned patent applications.

Starting feed solutions for treatment in the present integrated process may be prepared by standard known methods as for example those used in the treatment of scheelite ores. Tungsten primarily occurs in commercial quantities, i.e., as an ore, as the mineral scheelite. The scheelite ore is first treated by physical concentration techniques starting with grinding and classifying followed by flotation to upgrade the tungsten content from about 0.5 percent tungsten to about 10.0 percent tungsten. At this point the ore is highly contaminated with molybdenum and silicon as well as some phosphorus, aluminum and fluorine.

TABLE I

| Amine | Conc., M | Diluent | Percent $WO_3$ Extracted |
|---|---|---|---|
| Dodecenyl primene 81 | 0.2 | 85% kerosene, 15% n-butanol | 98 |
| $CH_3$ $CH_3$<br>CH—C—$CH_2$—C—$CH_2$—CH=CH—$CH_2$—N—C—R'<br>$CH_3$ $CH_3$ R''<br>where R+R'+R''=11 to 14 carbon atoms. | | | |
| Dodecenyl primene 81—Secondary amine with the following structure: | 0.2 | 100% kerosene | <90 |
| $CH_3$ $CH_3$ H R<br>$CH_3$—C—$CH_2$—C—$CH_2$—CH=CH—$CH_2$—N—C—R'<br>$CH_3$ $CH_3$ R''<br>where R+R'+R'' contain 11 to 14 carbon atoms. | | | |
| Bis(1 isobutyl-3,5-dimethyl hexyl) | 0.2 | 90% kerosene, 10% n-butanol | <99.5 |
| Bis(1-isobutyl-3,5-dimethyl hexyl) | 0.2 | 100% diisobutyl ketone | <99.5 |
| Tertiary octyl | 0.2 | 90% kerosene, 10% n-butanol | 37 |
| Triisooctyl | 0.2 | do | 34 |
| Triamyl | 0.2 | 100% diethyl ketone | 94 |
| Bis(tridecyl) | 0.1 | 95% kerosene, 5% undecanol | <90 |
| Tris(tridecyl) | 0.1 | do | <90 |
| Aniline | 2.7 | 100% toluene | 82 |
| Primene JM-T—Primary amine with the following structure: | 0.2 | 90% kerosene, 10% n-butanol | 98 |
| R<br>R'—C—$NH_2$<br>R''<br>where R+R'+R''=15 to 21 carbon atoms. | | | |
| Bis(methyl benzyl) | 0.2 | 100% diethyl ketone | 78 |
| Bis(decyl) | 0.2 | 90% kerosene, 10% hexyl alchool | 98 |
| N-Benzyl-1(3-ethylpentyl)-4-ethyl octyl | 0.2 | 100% kerosene | 87 |

After the contacting or mixing step between the organic and aqueous phase, the organic phase will contain a major portion of the total tungsten values. It will also contain The concentrate from the physical concentration section is then passed to a chemical treatment section. The scheelite here is first digested under pressure in a concentrated sodium carbonate solution to leach out the tungsten values. During leaching of tungsten from the scheelite ore, molybdenum and silicon as well as sodium fluoride, copper, aluminum and phosphorus are also leached from the ore. The leach liquors typically analyze 110 grams/liter of $WO_3$, 4.5 grams/liter Mo, 120 grams/liter of $Na_2CO_3$, 1.5 grams/liter of $SiO_2$ and 3.75 grams/liter of F.

The leach liquors generally range in pH from about 10.5 to about 11.0. Accordingly it may not be necessary to adjust the pH at all prior to addition of the alkali sulfide in the molybdenum removal step when the starting liquor results from a sodium carbonate leach of the starting ore. The treatment of the starting scheelite ore by physical and chemical beneficiation techniques to form the starting leach liquors are generally well known in the art.

At this point the leach liquor is passed to the integrated process of the present invention.

First, if necessary, the molybdenum-contaminated alkaline solution of tungsten values is adjusted to a pH of at least 8 or higher and then at least 170 percent of the amount of alkali sulfide stoichiometrically required to convert the molybdenum contaminant in the solution to a thio-molybdate complex ion is added to the solution. The alkaline solution is so treated at an elevated temperature until the molybdenum contaminant is converted to the thiomolybdate complex ion and then is acidified with sulfuric acid for example until the pH of the solution is below about 3.0 whereby the thiomolybdate complex ion is converted to insoluble molybdenum trisulfide which precipitates from solution. The molybdenum is then separated as insoluble molybdenum trisulfide from the acidified solution of tungsten values.

In the foregoing description of the molybdenum removal step, it was stated that the pH of the molybdenum contaminated alkaline solution of tungsten values should be at least 8 prior to precipitation of molybdenum. This represents the lowest degree of alkalinity which is tolerable in the integrated process of the present invention. If the pH is permitted to fall below 8 a complete conversion of the molybdenum contaminant to the thiomolybdate complex ion is not achieved and incomplete precipitation of the molybdenum trisulfide results. Most satisfactory results are obtained when the pH is greater than 10.

It was also previously stated that the digestion of the sulfide treated solution should be effected at an elevated temperature. The lower the temperature is during digestion, the longer the period of time necessary to obtain the essential thiomolybdate complex ion which is represented by the formula $MoS_4^=$. Preferably the digestion should be performed at a temperature in excess of 80° C. Digestion at a temperature of about 85° C. for about one hour has been found to be quite satisfactory.

The reagent which is employed for treating the alkaline solution of tungsten values is an alkali sulfide. Included within this term are sodium sulfide ($Na_2S$), sodium acid sulfide (NaHS), postassium sulfide ($K_2S$) and potassium acid sulfide (KHS).

To illustrate the importance of employing 70 percent in excess of the stoichiometric amount of the alkali sulfide required to cause formation of the thiomolybdate complex ion (i.e., 170 percent of the theoretical requirement) a series of tests were performed under substantially identical conditions except that the amount of excess sodium acid sulfide over and above that theoretically required to cause formation of the thiomolybdate complex ion was varied. After treatment with the alkali sulfide, the solutions were treated with sulfuric acid to lower the pH below about 2.3 and to eventually precipitate molybdenum as a molybdenum trisulfide in the manner described previously. The amount of molybdenum and tungsten remaining in the solution after precipitation and separation of the molybdenum trisulfide was determined. The results of these tests are shown in Table II.

TABLE II

*Molybdenum Content of Filtrate as a Function of NaHS Addition*

| Percent Excess NaHS | Mo Content (g./l.) | Ratio of W/Mo in Filtrate |
|---|---|---|
| 35 | 0.057 | 860 |
| 55 | 0.034 | 970 |
| 65 | 0.006 | 5,400 |
| 70 | 0.0009 | 56,000 |
| 110 | 0.0006 | 48,000 |

A typical tungsten containing sodium carbonate leach solution contains tungsten in an amount of about 110 grams per liter expressed as tungstic oxide, molybdenum in an amount of about 4.5 grams per liter, about 120 gm./liter sodium carbonate, about 1.5 grams per liter of silicon dioxide, about 3.75 grams per liter of fluorine and trace amounts of copper, aluminum, phosphorus and other elements. Upon treatment of such solutions by the process of the present invention the molybdenum content is reduced to less than 30 parts per million and usually to 2 parts per million generally with a $WO_3$/Mo ratio of 1800 to 1 or greater.

After treatment of such solutions as those described immediately above, on a laboratory scale, by employing 170 percent of the stoichiometric amount of sodium sulfide required to convert the molybdenum contaminant to the thiomolybdate complex ion followed by digestion and acidification to a pH in the range of 2.1 to 2.3 filtrates of the analyses shown in Table III were obtained.

TABLE III

| Grams of Tungstic Oxide per liter | Grams of Molybdenum per liter | Tungstic Oxide/Molybdenum Ratio |
|---|---|---|
| 40.8 | .0012 | 34,000 |
| 39.9 | .0012 | 33,250 |
| 40.0 | .0014 | 28,570 |
| 37.5 | .0020 | 18,750 |

To determine the effectiveness of the process of the present invention on a production scale, eight 12,000 gallon batches of substantially identical sodium carbonate leach solutions as those described above were secured and treated with greater than 170 percent of the stoichiometric amount of sodium sulfide required to convert the molybdenum contaminant to a thiomolybdate complex ion. The batches were then digested at about 85° C. and the pH was adjusted to about 2.3 to precipitate the molybdenum as molybdenum trisulfide. The molybdenum trisulfide was filtered from the solution. Samples were taken of the filtrate and the tungsten and molybdenum content was determined after treatment of each 12,000 gallon batch. The results are shown in Table IV.

TABLE IV

| Grams per Liter Tungstic Oxide | Grams per Liter Molybdenum | Tungstic Oxide/Molybdenum Ratio |
|---|---|---|
| 31.6 | .0013 | 24,308 |
| 37.1 | .00085 | 43,647 |
| 35.5 | .0011 | 32,273 |
| 35.6 | .0013 | 27,385 |
| 34.4 | .0011 | 31,273 |
| 33.9 | .0006 | 56,500 |
| 31.8 | .00085 | 37,411 |
| 29.0 | .0011 | 26,364 |

The tungsten loaded but molybdenum-free organic resulting from the organic solvent extraction step contains some amount of silicon in the form of a silico-tungsten complex. This silicon complex follows the tungsten values into the stripping solution and there is no complete and selective removal of tungsten from silicon contaminants during the organic solvent extraction step.

The silica-contaminated stripping solution is then treated to remove silica and recover silicon-free tungsten values. The silicon contaminated tungstate solution resulting from the organic solvent extraction step is made at least two molar in ammonium hydroxide and digested at a temperature of at least 50° C. for a period of at least one hour to cause precipitation of silica as an amorphous silicon dioxide.

The tungsten-oxide-loaded stripping solution resulting from the organic solvent extraction step is preferably digested at a temperature between 55° C. and the boiling point of the solution with mild agitation for a period of at least one hour to cause the silicon in solution to precipitate as silica. The precipitation step causes an increase of the tungstic oxide to silicon ratio to about 1500 to 1. The resulting solution is evaporated to cause the formation of ammonium paratungstate having less than about 30 p.p.m. of silicon.

The silica removal step is preferably conducted in ammonical tungstate solutions 0.2 to 1.0 molar in tungstic oxide and at least about 2 molar in ammonium hydroxide.

The temperature of precipitation must be at least about 50° C. The upper limit of the effective temperature is governed by the ability to keep ammonia in solution. If temperatures in excess of about 100° C. are utilized, a closed pressure vessel will most probably have to be employed to maintain the ammonia concentration at the required level.

In a pilot plant operation utilizing the above integrated process, 100 gallons of tungstic-oxide-loaded stripping solution (containing 200–225 grams/liter of tungstic acid), about 2 molar in ammonium hydroxide was digested at a temperature of 55 to 60° C. for a period of about two and one-half hours to cause precipitation of silica. Evaporation of this solution yielded 85 percent of the tungstic oxide as ammonium paratungstate containing 0.0029 weight percent silicon.

Following is an example of an actual mill operation utilizing the present integrated process.

Twelve thousand gallons of a clarified sodium carbonate leach liquor resulting from pressure leached scheelite ore was first secured from a sodium carbonate digester circuit. The leach liquor analyzed 55 gm./l. $WO_3$, 2.1 gm./l. molybdenum, 1.05 gm./l. silicon dioxide and 2.15 gm./l. fluorine. The leach liquor was then passed to the molybdenum removal section. The solution was heated to a temperature of about 75° C. and 140 gallons of 44 percent NaHS were added to the heated solution. The solution was agitated for a period of about one hour at a temperature of about 80° C. until the molybdenum in the solution was converted to the thiomolybdate complex ion. Sulfuric acid was then added to the heated solution containing the thiomolybdate complex ion in sufficient amounts to adjust the pH downward to about 2.7. The molybdenum precipitated from the solution as molybdenum trisulfide and a slurry was formed. The slurry was filtered to remove the precipitated molybdenum trisulfide and a substantially molybdenum free aqueous phase was formed. The aqueous phase analyzed 51.8 gm./l. $WO_3$ tungsten, .0012 gm./l. molybdenum, 0.75 gm./l. silicon dioxide and 2.1 gm./l. fluorine.

The aqueous phase was then passed to the organic solvent extraction section. In the organic solvent extraction section the aqueous phase was contacted with an organic extractant phase at a temperature of about 55° C. The organic extractant phase formulation contained the following: 5 weight percent bistridecylamine, 85 weight percent of a high flash point kerosene solvent and 10 weight percent of the long chain aliphatic alcohol undecanol as a phase conditioner. Contact of the aqueous phase with the organic extractant phase was accomplished in 3 countercurrent mixer settler stages. The aqueous and organic phases were contacted at a 1.1 to 1 volume ratio organic to aqueous, and the tungsten values were transferred from the aqueous phase to the organic phase. The tungsten loaded organic phase was then contacted with water in a single washing stage comprised of a mixer-settler combination wherein the aqueous-organic phase was maintained at a .75–1 volume ratio. The washed organic phase was then passed to the stripping section and contacted with a 3 normal aqueous ammonium hydroxide solution by cocurrent flow through two mixers and a single settler. The aqueous-organic phase was maintained at a ratio of about 1.1 to one during the stripping operation and the temperature of the phases was about 55° C. The stripping operation was continued by recycling the aqueous ammonium hydroxide solution through the stripping section until the steady state concentration of tungsten in the aqueous ammonium hydroxide solution was about 225 grams of tungsten trioxide per liter. The aqueous solution at this point also contained in excess of .40 gm./l. silicon.

Silicon was removed by passing the aqueous ammonium hydroxide solution, intermediately between each pass through the stripping section, to a hold tank. In the holding tank, the aqueous ammonium hydroxide solution was maintained, at about 2.7 molar in ammonium hydroxide, at a temperature of about 55° C. for a period of about one and one-half hours to cause precipitation of silicon dioxide and formation of a slurry. After the precipitation of silicon dioxide the resultant slurry is filtered and the silicon-free filtrate containing the tungsten values was sent to an ammonium paratungstate crystallizing section. In the crystallizer section the filtrate from the silicon precipitation section is heated to evaporate the solution and form crystals of ammonium paratungstate. The resultant ammonium paratungstate analyzed as follows: 88.98 weight percent $WO_3$, .0012 weight percent molybdenum, .0020 weight percent silicon, .00005 weight percent copper, .001 weight percent aluminum and .0011 weight percent sodium.

While the present invention has been described in some detail, it is contemplated that minor variations may be made in the process disclosed herein without departing from the spirit and scope of the present invention.

What is claimed is:

1. In a process for recovery of tungsten values from molybdenum and silicon contaminated aqueous solutions of tungsten wherein said tungsten is separated from other ore contaminants by extraction with an amine dissolved in an organic liquid solvent, the improvement comprising the sequential steps of first treating said contaminated aqueous tungsten bearing solution, prior to the amine organic solvent extraction step, to selectively remove molybdenum therefrom by adjusting the pH of said molybdenum contaminated aqueous solution to at least about 8, adding to said aqueous solution essentially at least 170 percent of the amount of alkali sulfide stoichiometrically required to convert the molybdenum contaminant in said aqueous solution to the thiomolybdate complex ion, digesting said aqueous solution at elevated temperature until the molybdenum contaminant is converted to the thiomolybdate complex ion; acidifying said aqueous solution to a pH below about 3.0 whereby the molybdenum contaminant is precipitated as molybdenum trisulfide, separating the molybdenum trisulfide precipitate from the aqueous molybdenum free solution, contacting the aqueous solution with said amine dissolved in an organic liquid solvent thereby extracting said tungsten and silicon contaminant into the organic solvent liquid phase, separating the organic solvent phase and the aqueous phase, contacting said organic solvent phase with an aqueous solution of ammonium hydroxide and stripping said tungsten and silicon from the organic phase into said aqueous solution; separating said organic phase and aqueous solution, adjusting and maintaining the concentration of ammonium hydroxide in the silicon-contaminated tungsten-containing aqueous ammonium hydroxide solution to at least about 2 molar, adjusting and maintaining the temperature of the aqueous silicon-contaminated ammonium hydroxide solution to at least 50° C., digesting the aqueous silicon contaminated and tungsten-bearing ammonium hydroxide solution at said temperature while maintaining a concentration of ammonium hydroxide in said silicon contaminated solution of at least 2 molar to cause selective precipitation of silicon oxide therefrom and concentrating the resultant tungsten-bearing solution to precipitate ammonium paratungstate substantially free of silicon and molybdenum therefrom.

2. A process in accordance with claim 1 wherein the pH of the molybdenum and silicon contaminated tungsten-bearing solution is adjusted to a pH of greater than about 10 prior to addition of alkali sulfide thereto, and the alkali sulfide containing molybdenum and silicon contaminated tungsten-bearing aqueous solution is digested at a temperature greater than about 80° C.

3. A process in accordance with claim 1 wherein the silicon contaminated and tungsten-bearing aqueous strip solution is digested at a temperature ranging from about 55° C. up to the boiling point of said solution for at least one hour.

4. In a process for recovery of tungsten values from molybdenum and silicon contaminated aqueous solutions of tungsten wherein said tungsten is separated from other ore contaminants by extraction with an amine dissolved in an organic liquid solvent, the improvement comprising the sequential steps of first treating said contaminated aqueous tungsten-bearing solution, prior to the amine organic solvent extraction step, to selectively remove molybdenum therefrom by adjusting the pH of said molybdenum contaminated aqueous solution to at least about 10, adding to said aqueous solution essentially at least 170 percent of the amount of alkali sulfide stoichiometrically required to convert the molybdenum contaminant in said aqueous solution to the thiomolybdate complex ion, said alkali sulfide being at least one member selected from the group consisting of sodium sulfide, sodium acid sulfide, potassium sulfide, and potassium acid sulfide, digesting said aqueous solution at a temperature of about 85° C. until the molybdenum contaminant is converted to the thiomolybdate complex ion; acidifying said aqueous solution to a pH below about 3.0 whereby the molybdenum contaminant is precipitated as molybdenum trisulfide, separating the molybdenum trisulfide precipitate from the aqueous molybdenum free solution, contacting the aqueous solution with said amine dissolved in an organic liquid solvent thereby extracting said tungsten and silicon contaminant into the organic solvent liquid phase, separating the organic solvent phase and the aqueous phase, contacting said organic solvent phase with an aqueous solution of ammonium hydroxide and stripping said tungsten and silicon from the organic phase into said aqueous solution, adjusting and maintaining the concentration of ammonium hydroxide in the silicon-contaminated tungsten-containing aqueous ammonium hydroxide solution to at least about 2 molar, adjusting the concentration of tungsten in terms of tungstic oxide to range from about 0.2 molar to about 1.0 molar, adjusting and maintaining the temperature of the aqueous silicon-contaminated ammonium hydroxide solution to about 55° C., digesting the aqueous silicon-contaminated and tungsten-bearing ammonium hydroxide solution at said temperature while maintaining a concentration of ammonium hydroxide in said silicon contaminated solution of at least 2 molar to cause selective precipitation of silicon oxide therefrom and concentrating the resultant tungsten-bearing solution to precipitate ammonium paratungstate substantially free of silicon and molybdenum therefrom.

References Cited in the file of this patent

UNITED STATES PATENTS

| | | |
|---|---|---|
| 2,339,888 | Smith | Jan. 25, 1944 |
| 2,556,255 | Carosella | June 12, 1951 |
| 2,877,250 | Brown et al. | Mar. 10, 1959 |
| 3,083,076 | Drobnick et al. | Mar. 26, 1963 |

OTHER REFERENCES

Hampel: "Rare Metals Handbook," Reinhold Pub. Corp., New York, 1954, page 281.

Coleman et al.: "Proceedings of International Conference on Peaceful Uses of Atomic Energy," volume 28, pages 278–288, Geneva, 1958.